United States Patent [19]
Lundy

[11] 3,774,581
[45] Nov. 27, 1973

[54] COMBINATION POPPET AND REED VALVE

[75] Inventor: John H. Lundy, Okemos, Mich.

[73] Assignee: General Motors Corporation, Detroit, Mich.

[22] Filed: Oct. 4, 1972

[21] Appl. No.: 294,823

[52] U.S. Cl...... 123/70 R, 123/188 A, 123/188 AF, 123/188 VA, 123/90.14
[51] Int. Cl. .......................... F02b 33/22, F01l 3/00
[58] Field of Search ...................... 123/70 R, 188 R, 123/188 A, 188 AF, 188 VA, 70 V, 90.14

[56] References Cited
UNITED STATES PATENTS

| | | | |
|---|---|---|---|
| 3,623,463 | 11/1971 | DeVries | 123/70 R |
| 2,669,979 | 2/1954 | Kiekhaefer | 123/73 V |
| 3,306,276 | 2/1967 | Harkness et al. | 123/90.14 |

FOREIGN PATENTS OR APPLICATIONS

| | | | |
|---|---|---|---|
| 362,894 | 6/1930 | Great Britain | 123/70 R |
| 456,098 | 6/1913 | France | 123/188 A |

Primary Examiner—Laurence M. Goodridge
Assistant Examiner—Dennis Toth
Attorney—J. L. Carpenter et al.

[57] ABSTRACT

A combination poppet and reed valve consisting of a poppet valve with a flat-type head having a plurality of inlet apertures therethrough normally closed by a reed valve element.

3 Claims, 3 Drawing Figures

Patented Nov. 27, 1973 3,774,581

COMBINATION POPPET AND REED VALVE

This invention relates to an intake valve for internal combustion engines and, in particular, to an intake valve for a split cylinder internal combustion engine.

Intake valves for internal combustion engines are normally of the poppet-type, seating against a valve seat in the head of the engine to control the flow of air to an engine cylinder during the induction cycle of each cylinder of the engine. When this type valve is used, air intake and the timing thereof is, in effect, controlled solely by the unseating and seating of the valve, with the flow of intake air into the cylinder being affected by the intake area, as defined by the area of the opening between the valve seat and the poppet valve head when unseated from its valve seat.

Accordingly, the principal object of this invention is to provide a poppet valve structure for use as an intake valve in an internal combustion engine to permit late opening of the intake valve and to reduce pumping losses in the engine.

Another object of this invention is to provide an improved intake valve adapted to provide for the improved ingress of air into the induction cylinder of an internal combustion engine and, specifically, into the induction or compression cylinder of a split cylinder type internal combustion engine.

These and other objects of the invention are attained by means of a poppet valve, the flat head of which is provided with a plurality of inlet apertures therethrough, these apertures being normally closed by a reed valve suitably secured to the flat surface of the head of the poppet valve.

For a better understanding of the invention, as well as other objects and further features thereof, reference is had to the following detailed description of the invention to be read in connection with the accompanying drawings, wherein.

Figures 1, 2, 3:
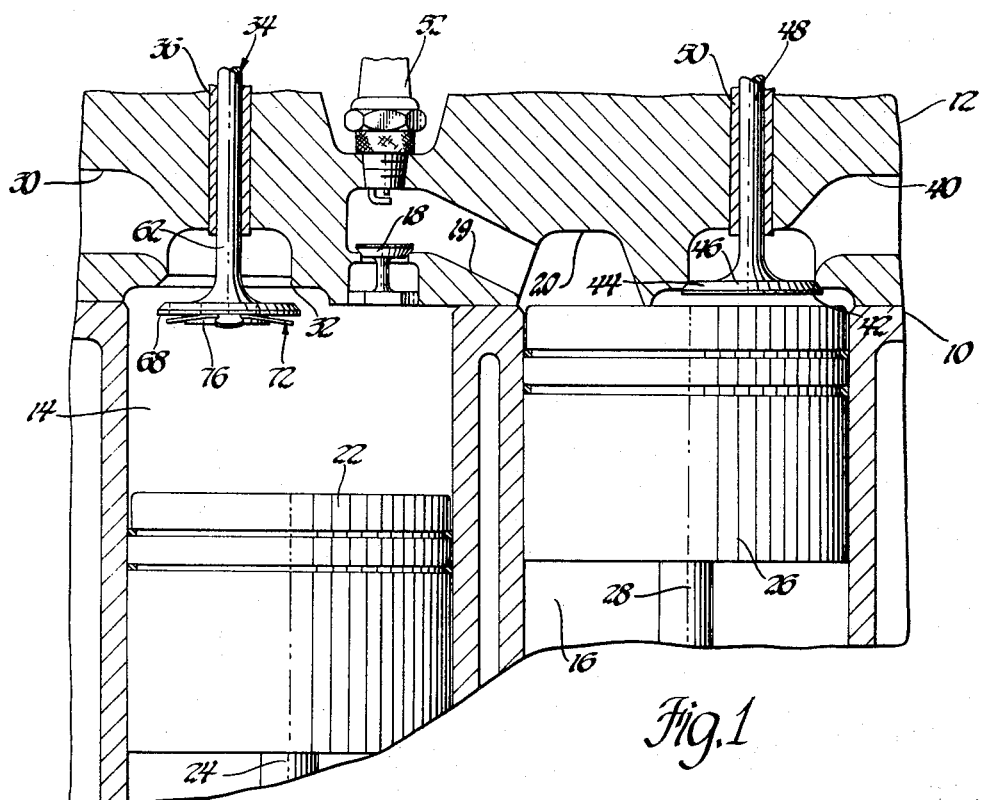
FIG. 1 is a sectional view of a portion of the associated cylinders of a split cylinder-type internal combustion engine having a combination poppet and reed valve structure of the invention positioned to control ingress of air into the compression cylinder of the engine.
FIG. 2 is an enlarged view of a portion of the combination poppet and reed valve of the invention with the head of this valve shown in section to illustrate the details of the valve structure; and, FIG. 3 is a bottom view of the head portion of the combination poppet and reed valve structure of FIG. 2.

Referring now to FIG. 1, there is illustrated schematically a portion of a split cylinder internal combustion engine of the type, for example, in which two adjacent cylinders of the engine are coupled together so that intake and partial compression of the combustion mixture of fuel and air occurs in one cylinder with final compression, combustion, expansion and exhaust occurring in the adjacent cylinder. The partially compressed mixture is transferred from the first cylinder into the adjacent cylinder through a valve controlled combustion chamber located between and connecting these cylinders together.

As seen in FIG. 1, the split cylinder internal combustion engine includes a cylinder block 10 and cylinder head 12, the cylinder block being provided with adjacent pairs of cylinders including a compression or induction cylinder 14, hereinafter referred to as the induction cylinder, and a power cylinder 16 connected together through a transfer valve 18 controlled ignition or prechamber 19 into the combustion chamber which includes power cylinder 16 and the combustion chamber 20 provided in the cylinder head 12 in direct communication with prechamber 19.

Induction cylinder 14 has a piston 22 mounted therein for reciprocal movement, the piston 22 being connected by a piston rod 24 to the crank of the engine, not shown, and in a similar manner, the power cylinder 16 is provided with a power piston 26 connected by the piston rod 28 to the engine crank so that the piston 22 in the induction cylinder 14 leads the piston 26 in the power cylinder by, for example, ninety degrees crank angle.

The cylinder head 12 is provided with an intake manifold having a port 30 to cylinder 14 formed with a valve seat 32, of frusto-conical configuration, controlled by an intake valve, generally designated 34, constructed in accordance with the invention, and having an elongated valve stem slidably supported in a valve guide 36 and is reciprocated in suitable timed relation to the operation of other components of the engine in a known manner, not shown, to regulate the opening and closing movements of this valve head relative to the valve seat 32.

Cylinder head 12 is also provided with an exhaust port 40 to power cylinder 16 formed with a valve seat 42 controlled by the bevelled annular seating portion 44 on the head of the exhaust valve 46 carried on the end of the valve stem 48. The stem 48 of the exhaust valve is slidably supported in a valve guide 50 and is reciprocated in timed relation to the operation of other components of the engine in a known manner, not shown.

In the operation of the split cylinder internal combustion engine of the type shown in FIG. 1, incoming charges of the combustion mixture move through the carburetor, not shown, and the intake manifold through the intake port 30 to the induction cylinder 14 during the induction stroke, that is, as the piston 22 in this cylinder moves down toward the position as shown. At the completion of the induction stroke, the charge is then compressed in the induction cylinder 14 until the transfer valve 18 opens, due to the differential pressure on opposite sides of this valve. The charge then is displaced into the power cylinder 16 through the prechamber 19 and combustion chamber 20. During the early part of this transfer process, the exhaust valve 46 of the power cylinder is closed and compression occurs in this power cylinder 16 and in the induction cylinder 14 until the transfer valve 18 closes, which occurs immediately after the piston 22 in the induction cylinder 14 reaches top dead center. Compression continues in the power cylinder 16 with ignition taking place in the ignition or prechamber 19 by means of the spark plug 52 which ignites the last part of the combustion mixture transferred from the induction cylinder 14 into the combustion chamber 20.

After ignition in the prechamber 19, the flame progresses to the combustion chamber 20 and power cylinder 16 where combustion is completed in a mixture including the fresh charge of the combustion mixture and burned products from the previous combustion cycle.

Expansion then occurs throughout the power stroke of the piston 26 with the exhaust valve 46 opening before bottom dead center as in a conventional engine.

Exhaust from the power cylinder 16 occurs partly by blowdown and partly by piston 26 displacement. The exhaust valve 46 closes early on the compression stroke so that burned products are trapped in the power cylinder 16 during the time the fresh charge of combustion mixture is transferred from the induction cylinder 14 through the prechamber 19 into the combustion chamber 20 and upper portion of the power cylinder 16. Compression of the fresh charge and trapped burned products occurs together with most of the mixing occurring near top dead center of the compression stroke of piston 26.

Referring now to the subject matter of the invention, the intake valve 34 is a combination poppet and reed valve. As seen best in FIGS. 2 and 3, the intake valve 34 comprises a valve stem 62 and valve head 64 integral therewith, the head 64 being provided with an annular bevelled seating portion 66 for cooperation with the intake valve seat 32 in the cylinder head 12 of the engine. In addition, the valve head 64 is provided with a planar or flat underside or bottom surface 68 opposite the valve stem and with a plurality of through passages or apertures 70 normally closed by a reed valve element 72.

As shown in FIG. 3, the apertures 70 are preferably four in number and circular in configuration, circumferentially equally spaced around the valve head 64 in a pattern concentric with the axis of stem 62. The reed valve element 72 is of cloverleaf configuration so that the flexible leaf portions 72a thereof overlie the apertures 70 to close off the apertures 70 when the reed valve 72 is seated against the flat underside surface 68 of the valve head. The reed valve element 72 is fixed by its central aperture portion 72b to the underside of the valve head 64 by means of a threaded fastener 74 inserted through an annular stepped reed valve stop 76 and threaded into the threaded central aperture 78 in the valve head and stem.

In the operation of an intake valve with reference to the engine structure of FIG. 1, the ingress of the combustion mixture into the induction cylinder 14, when using a conventional poppet valve, would be controlled merely as a function of the length of time that the intake valve was open and the flow area between the valve seat and the seating surface of the poppet valve.

With a conventional intake poppet valve, the timing of the unseating and seating of the poppet valve is relatively critical and the induction flow rate can only be increased by increasing the size of the intake port with a corresponding increase in the size of the poppet valve.

However, with the combined poppet and reed valve structure of the invention, the timing of the unseating of the poppet portion of the subject intake valve is less critical since, as soon as the piston 22 moves downward in the induction cylinder 14 on an induction stroke, it will create a differential pressure head to occur on opposite sides of the valve head 64 so that the higher pressure of the combustion mixture in inlet manifold as compared to the pressure in the induction cylinder will unseat the reed valve 72 to cause it to move from the solid position shown in FIG. 2 to the dotted position shown in this figure, to allow for the ingress of air through the intake port 30 into the induction cylinder 14. Then, as the valve head 64 of this intake valve 34 is unseated from seat 32, additional combustion mixture is free to flow from the intake port 30 into the compression cylinder 14 in a conventional manner until the pressure in the induction cylinder 14 equals that in the intake port 30. Then, as the poppet valve head is again reseated on the valve seat 32 and the piston 22 in the induction cylinder 14 starts upward on a compression stroke, the higher pressure thus generated in the induction cylinder will act against the underside of the reed valve 72 to force it into seating engagement with the underside flat surface 68 of the valve head 64 to close off the apertures 70 through the valve head.

From the above description, it is apparent that the combined intake poppet and reed valve structure of the subject invention permits late opening of the intake valve on a split cylinder engine and is effective to reduce pumping losses in the engine. For a given size intake valve, the subject combined poppet and reed valve will permit greater intake of the combustion mixture than would a conventional poppet valve. The combined poppet and reed valve structure of the invention has been shown as being preferably utilized in a split cylinder internal combustion engine since, in such an engine, the compression cylinder thereof would operate at a much cooler temperature than the power cylinder and, therefore, the reed valve can be made of relatively thin flexible material since it will not be affected by high operating temperatures such as would be encountered in a conventional internal combustion engine.

What is claimed is:

1. In a split cylinder internal combustion engine having an engine block means provided with an induction cylinder in communication with a combustion mixture inlet port having an annular bevelled valve seat therein, a combined poppet and reed valve reciprocally mounted in said engine block means in position to control the flow of said combustion mixture from said intake port to said induction cylinder, said combined poppet and reed valve having an elongated stem and a valve head, said valve head having an annular exterior bevelled seating portion adapted to cooperate with said annular bevelled valve seat, said valve head having a planar surface opposite said stem and axial extending passage means through said valve head and, a reed valve means secured to said valve head to cooperate with said planar surface to normally close said passage means.

2. In a split cylinder internal combustion engine according to claim 1 wherein said passage means in said valve head consists of a plurality of circumferentially equally spaced apertures and said reed valve includes a corresponding number of flexible leaf portions to overlie said apertures, said reed valve being secured concentric to said stem on the planar flat surface of said valve head.

3. In a split cylinder internal combustion engine according to claim 1 wherein said passage neans in said valve head consists of a plurality of circumferentially equally spaced apertures through said valve head and wherein said reed valve means is provided with a corresponding number of flexible leaf portions to overlie said apertures and wherein said intake valve includes an annular stepped reed valve stop fixed to said valve head with said reed valve means sandwiched therebetween and concentric thereto.

* * * * *